(12) United States Patent
Maciejewski et al.

(10) Patent No.: US 6,369,961 B1
(45) Date of Patent: Apr. 9, 2002

(54) LENS ASSEMBLY AND HOUSING THEREFOR FOR USE WITH A SUBMARINE PERISCOPE

(75) Inventors: Wendell C. Maciejewski, Wakefield; Riad Sayegh, West Kingston, both of RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/785,997

(22) Filed: Feb. 20, 2001

(51) Int. Cl.[7] ................................................. G02B 7/02
(52) U.S. Cl. ..................................................... 359/819
(58) Field of Search ................................. 359/811, 819, 359/828, 808, 818, 611

(56) References Cited

U.S. PATENT DOCUMENTS 2,953,870 A * 9/1960 Charles ...................... 359/611
3,594,061 A * 7/1971 James ........................ 359/600
5,191,483 A * 3/1993 Takizawa et al. ............ 359/819

* cited by examiner

*Primary Examiner*—Ricky Mack
*Assistant Examiner*—Omar Hindi
(74) *Attorney, Agent, or Firm*—Michael J. McGowan; Michael F. Oglo; Prithvi C. Lall

(57) ABSTRACT

In a lens assembly and housing therefor for use in conjunction with an optical apparatus, the lens assembly includes a lens frame of nonferrous material and defining a window having a lip therein along a periphery of the window, a lens disposed in the window and adjacent the lip, a pair of spaced magnets on the frame, and a grip formed on the frame. The housing includes first and second walls opposed to each other and in part defining a pocket, the first wall being nonferrous and the second wall being magnetically permeable, the pocket being adapted to receive the lens assembly with the grip of the frame extending beyond the pocket. The magnets interact with the magnetically permeable second wall of the pocket to releasably retain the lens assembly in the lens assembly housing.

13 Claims, 2 Drawing Sheets

LENS ASSEMBLY AND HOUSING THEREFOR FOR USE WITH A SUBMARINE PERISCOPE

STATEMENT OF GOVERNMENT INTEREST

The invention described herein may be manufactured and used by and for the Government of the United States of America for Governmental purposes without the payment of any royalties thereon or therefor.

BACKGROUND OF THE INVENTION

(1) Field of the Invention

The invention relates to lenses for viewing devices, such as periscopes, telescopes and microscopes, and is directed more particularly to a lens frame and a pocket for receiving same for use on a submarine periscope.

(2) Description of the Prior Art

In current submarine periscopes, circular lenses are screwed into place when needed. The lenses are affixed to a periscope assembly eye guard housing and, in particular to a component thereof referred to as a "blinder assembly". The blinder assembly serves to block out light to one eye of an operator and permit light to pass through a viewing aperture having therein a lens, such as a clear glass or, alternatively, a filter, to the other eye of the operator. When a lens is not in use, it often becomes misplaced or lost. There is no storage facility for lenses on the blinder assembly and, being relatively small (about 1 inch in diameter), the lenses are easily set aside and forgotten until needed, by which time the lens has frequently disappeared. However, even when properly stored and retrieved, screwing the lens into a blinder assembly requires a steady hand, sometimes under pressure.

In U.S. Pat. No. 2,953,970, issued Sep. 27, 1960, to Charles A. Maynard, there is shown a lens assembly in which one or more lenses are attached in telescopic fashion to an optical apparatus. A first lens is provided with a magnetic ring which is magnetically attracted to a magnetically permeable barrel ring of the optical apparatus. By virtue thereof, the first lens is held on the optical apparatus. A second lens may similarly be mounted on the first lens, and so on with additional lenses, to provide a series of axially aligned lenses selected for a given purpose.

In Maynard, adjacent lens retaining rings contain permanently magnetic portions, the poles of which are alignable with unlike poles in an adjacent ring. Each ring is provided with both north and south poles directed in each of two axial directions. The various unlike poles are attracted to each other to support one ring with respect to an adjacent ring. To disengage one ring from another, one ring is rotated with respect to the adjacent ring until similar poles are aligned, to cause a repelling force between the adjacent rings, which aids in disassembly. Alternatively, one ring may be rotated to a point of equilibrium, or non-attraction between the rings, permitting one ring to be detached from the adjacent ring.

The handling of the lens rings in the Maynard apparatus is thus not far removed from the current screw thread attachment in submarine periscope assemblies, described briefly above. Having to rotatably align rings so as to achieve magnetic equilibrium or repelling forces, is still required under less than ideal conditions.

Accordingly, there is a need for a lens which easily can be stored, retrieved from storage, and inserted into and removed from a pocket or housing in the periscope blinder assembly, and all done in a time efficient manner.

SUMMARY OF THE INVENTION

An object of the invention is, therefore, to provide a lens assembly and housing therefor for use in conjunction with a submarine periscope, and which is easily and quickly stored, and easily and quickly retrieved from storage for use. The lens is slipped into place in a pocket or housing in the blinder assembly and held in place without the use of tools or discrete fasteners, but easily removed from the blinder assembly and returned to storage.

With the above and other objects in view, as will hereinafter appear, a feature of the invention is the provision of a lens assembly and lens assembly housing for use in conjunction with an optical apparatus. The lens assembly comprises a generally planar lens frame of nonferrous material and defining a window having a lip therein disposed along a periphery of the window, a lens disposed in the window and adjacent the lip, a pair of spaced magnets on the frame, and a grip formed on the frame. The lens assembly housing comprises first and second walls opposed to each other and in part defining a pocket, the first wall being nonferrous and the second wall being magnetically permeable, the pocket being adapted to receive the lens assembly with the grip of the frame extending beyond the pocket. The magnets interact with the magnetically permeable second wall of the pocket to releasably retain the lens assembly in the lens assembly housing.

The above and other features of the invention, including various novel details of construction and combinations of parts, will now be more particularly described with reference to the accompanying drawings and pointed out in the claims. It will be understood that the particular device embodying the invention is shown by way of illustration only and not as a limitation of the invention. The principles and features of this invention may be employed in various and numerous embodiments without departing from the scope of the invention.

BRIEF DESCRIPTION OF THE DRAWINGS

Reference is made to the accompanying drawings in which is shown an illustrative embodiment of the invention, from which its novel features and advantages will be apparent, and wherein corresponding reference characters indicate corresponding parts throughout the several views of the drawings and wherein.

DESCRIPTION OF THE PREFERRED EMBODIMENT

Figure 2:
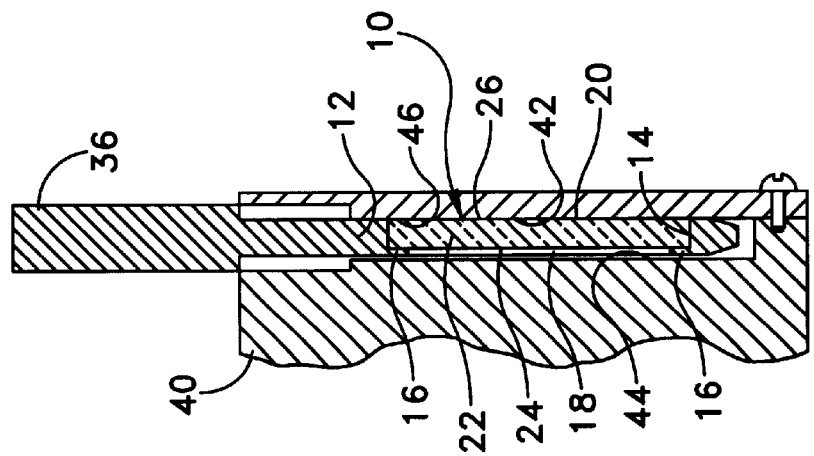
FIG. 2 is a sectional view taken along line II—II of FIG. 1, showing the lens assembly disposed in a cooperating pocket in a lens housing assembly.
Figure 1:
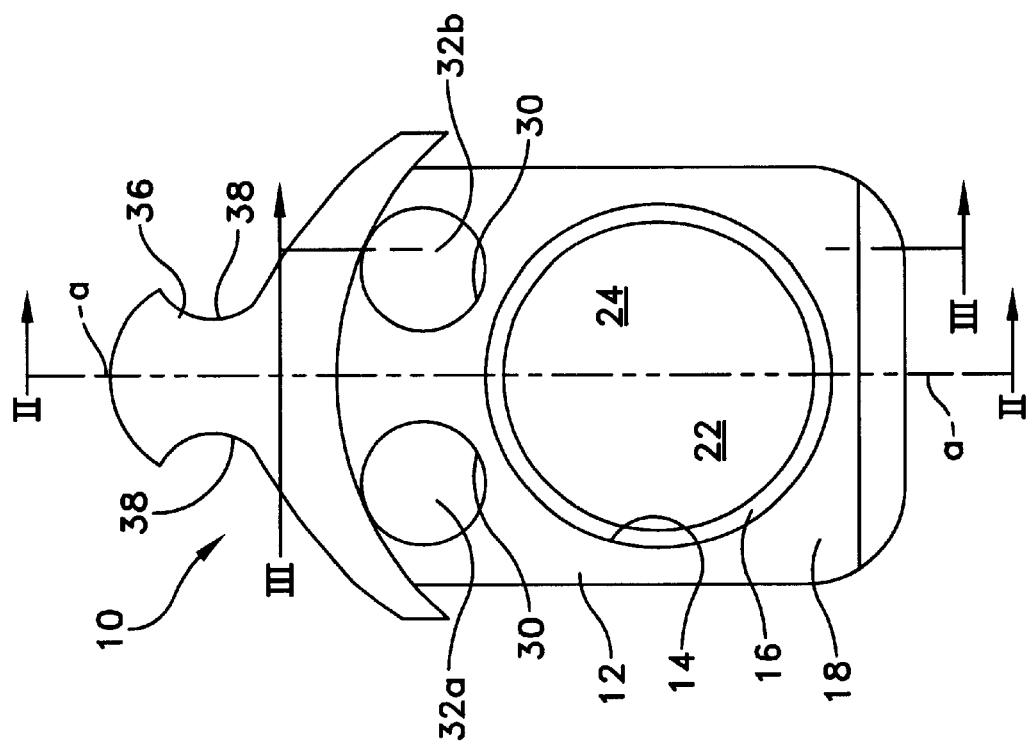
FIG. 1 is a front elevational view of a lens assembly in accordance with the invention.

Referring to FIGS. 1 and 2, it will be seen that the lens assembly 10 includes a generally planar frame 12 defining a window 14 having a lip 16 therein disposed along a periphery of window 14. The frame 12 is provided with first and second planar side surfaces 18, 20. The lip 16 is an extension of first side surface 18. The frame 12 is of a non-ferrous material, such as aluminum.

A lens 22 is disposed in window 14 and is adjacent lip 16. The lens 22 is of a thickness such that a peripheral portion of a first major surface 24 of lens 22 is fixed to lip 16. A second major surface 26 of lens 22 is flush with frame second surface 20. The lens 22 preferably is fixed to lip 16 by adhesive, or the like. As seen in FIG. 1, lens 22 preferably is circular and lip 16 is an annulus, as shown, or one or more portions of an annulus. The lens preferably is of glass or a plastics material, or a composite thereof. The lens may be of clear glass, or of a prescription-type glass for enhancing eyesight, or increasing the focus range of the periscope at both ends of the usual periscope range of focus, or a filter of darkened glass, similar to sunglasses, or a mirrored glass for substantial sun filtering, or may be omitted altogether, such that viewing occurs through the lens assembly without benefit of a lens of any type, or may be a "blank", that is, an opaque plate which stops light passing through the assembly.

The frame 12 is further provided with at least two openings 30 in each of which is fixed a magnet 32a, 32b. The magnets preferably are disposed, respectively, on opposite sides of a lengthwise axis of bilateral symmetry a—a (FIG. 1) and are in substantial alignment widthwise.

A grip 36 extends from frame 12 and preferably comprises a protrusion integral with frame 12. The grip 36 is provided with opposed recessed portions 38 (FIG. 1) to facilitate gripping thereof by an operator.

Figure 3:
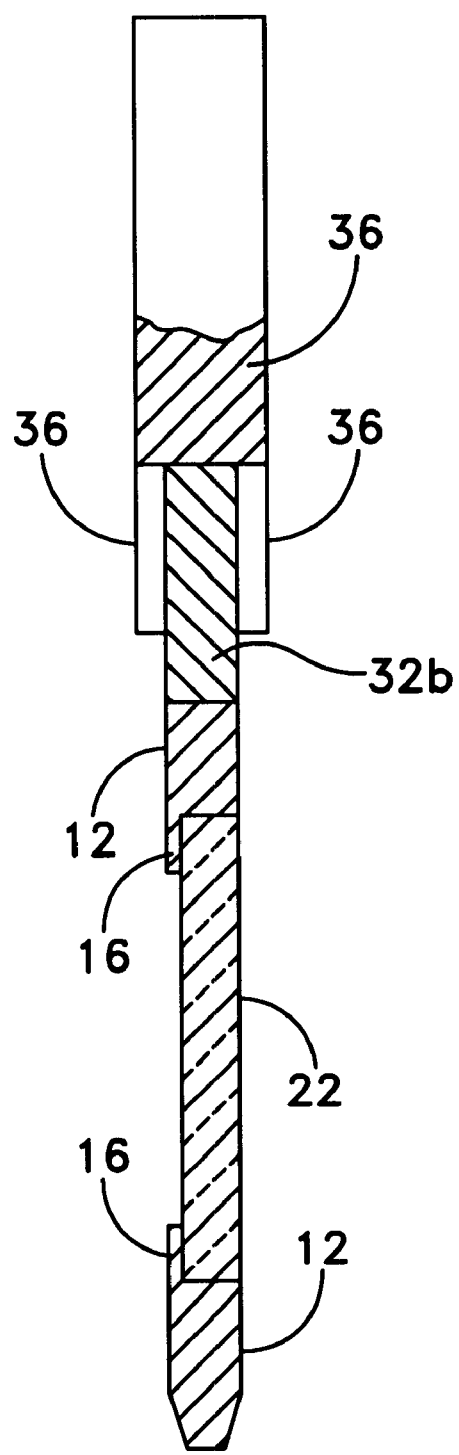
FIG. 3 is a sectional view taken along line III—III of FIG. 1.

Referring to FIGS. 2 and 3, it will be seen that a lens assembly housing 40 includes a pocket 42 defined in part by first and second walls 44, 46 opposed to each other. The first wall 44 is of a nonferrous material, such as aluminum. The second wall 46 is magnetically permeable. As shown in FIG. 2, the pocket 42 is adapted to slidingly receive the lens assembly 10 with the grip 36 extending outwardly from the housing 40 to facilitate manipulation of the lens assembly by an operator.

In operation, one or more lens assemblies 10 are disposed in the optical line of sight of the blinder, or are disposed in storage facilities, such as housing 40, that include the first and second walls 44, 46. The wall 46 is made of a ferrous metal that is magnetically permeable, i.e., provides a flux path. The other wall 44 is nonferrous. The two magnets 32a, 32b are press fit into the lens assemblies 10 such that they are flush mounted within the thickness of the lens assembly frame 12. The magnets 32a, 32b are adapted to generate a magnetic circuit flux. The flux, in turn, generates a magnetic force between the magnets 32a, 32b and the ferrous wall 46.

When the lens assemblies are housed in the blinder or housing 40, the grips 36 are exposed. The grips 36 may be provided with visible indicia by which lenses may be distinguished. An operator removes an appropriate lens assembly 10 from the blinder housing or storage facility by grasping the appropriate exposed grip 36, exerting a small amount of force and withdrawing the lens assembly. The operator then places the lens assembly in the viewing position slot, bringing the lens assembly magnets 32a, 32b into contact with the ferrous material (i.e., magnetically permeable material) portion of the blinder assembly pocket which then holds the lens assembly in place in the viewing position. When use of the lens is no longer desired, the lens assembly 10 is manually withdrawn from the pocket of the blinder assembly, i.e., the viewing position, and returned to its place in a storage slot. As is well understood in the art, the disk magnets 32a, 32b each generate a flux field through the adjacent zone of the wall 46 which is made of ferrous material. This acts as a magnetic detent, securely maintaining the lens assembly 10 in the pocket 42 until manually withdrawn.

There is thus provided a lens assembly which easily can be stored, retrieved from storage and inserted into a periscope blinder assembly viewing position. When desired, the lens assembly easily can be removed from the blinder assembly viewing position and returned to storage. No tools are required, and time required to provide a lens, or change lenses, is minimal.

It will be understood that many additional changes in the details, materials, and arrangement of parts, which have been herein described and illustrated in order to explain the nature of the invention, may be made by those skilled in the art within the principles and scope of the invention as expressed in the appended claims. For example, while the above description of the invention is focused on the use of the invention in combination with a submarine periscope, and while it is expected that the invention will provide substantial benefits when used in that manner, it will be apparent that the invention finds further application in connection with telescopes and microscopes, and any optical device or viewing device in which use of lenses is beneficial.

What is claimed is:

1. A lens assembly and lens assembly housing for use in conjunction with an optical apparatus;
   said lens assembly comprising:
      a generally planar lens frame of nonferrous material and defining a window having a lip therein disposed along a periphery of the window;
      a lens disposed in said window and adjacent said lip;
      a pair of spaced magnets on said frame;
      a grip formed on said frame; and
      said lens assembly housing comprising:
         first and second walls opposed to each other and in part defining a pocket, said first wall being nonferrous and said second wall being magnetically permeable, the pocket being adapted to receive said lens assembly with said grip of said frame extending beyond the pocket;
   wherein said magnets interact with the magnetically permeable second wall of the pocket to releasably retain said lens assembly in said lens assembly housing.

2. The invention in accordance with claim 1 wherein said frame is provided with first and second planar side surfaces, said lip being an extension of said first of said side surfaces, and said lens being of a thickness such that a peripheral portion of a first major surface of said lens is fixed to said lip, and a second major surface of said lens is flush with said frame second side surface.

3. The invention in accordance with claim 2 wherein said lens is fixed on said lip by adhesive.

4. The invention in accordance with claim 1 wherein said frame is of nonferrous metal.

5. The invention in accordance with claim 4 wherein said nonferrous metal is aluminum.

6. The invention in accordance with claim 1 wherein said window is circular and said lip is at least a portion of an annulus.

7. The invention in accordance with claim 1 wherein said frame is provided with a pair of spaced openings and said magnets are disposed in said openings.

8. The invention in accordance with claim 1 wherein said planar frame has an elongated shape of bilateral symmetry about a lengthwise axis of symmetry and said magnets are on opposite sides of said axis of symmetry of said assembly and are in alignment widthwise of said axis, and are disposed between said window and said grip.

9. The invention in accordance with claim 1 wherein said grip comprises a protrusion integral with said frame.

10. The invention in accordance with claim 9 wherein said protrusion is provided with opposed recessed portions to facilitate gripping thereof by an operator.

11. The invention in accordance with claim 2 wherein said lens is of a material selected from a group of materials, the group of materials consisting of clear glass, clear plastics, clear glass/plastics composite, prescription-type clear glass, prescription-type clear plastic, prescription-type clear glass/plastics composite, darkened glass, darkened plastics, darkened glass/plastics composite, mirrored glass, mirrored plastics, mirrored glass/plastics composite, and opaque material.

12. A lens frame assembly for use with a submarine periscope eye guard housing, said lens frame assembly comprising:

a generally planar frame defining a window having a lip therein disposed along a periphery of the window, the window and said lip being adapted to retain a lens closing said window and fixed to said lip;

a pair of spaced magnets mounted on said frame; and a grip extending from said frame.

13. The lens frame assembly in accordance with claim 12 and further comprising adhesive disposed on said lip for fixing the lens to said lip.

* * * * *